United States Patent
Martin et al.

(10) Patent No.: US 12,411,724 B2
(45) Date of Patent: Sep. 9, 2025

(54) I/O PATH ANOMALY DETECTION

(71) Applicant: Dell Products L.P., Round Rock, TX (US)

(72) Inventors: Owen Martin, Hopedale, MA (US); Michael Scharland, Franklin, MA (US); Peter Linden, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 18/416,085

(22) Filed: Jan. 18, 2024

(65) Prior Publication Data

US 2025/0238301 A1    Jul. 24, 2025

(51) Int. Cl.
*G06F 11/00* (2006.01)
*G06F 11/07* (2006.01)

(52) U.S. Cl.
CPC ........ *G06F 11/079* (2013.01); *G06F 11/0745* (2013.01)

(58) Field of Classification Search
CPC ............................ G06F 11/079; G06F 11/0745
USPC ....................................................... 714/1–57
See application file for complete search history.

(56) References Cited

U.S. PATENT DOCUMENTS

| | | | | |
|---|---|---|---|---|
| 11,074,302 B1 * | 7/2021 | Nadav | ..................... | G06N 5/045 |
| 11,704,189 B1 * | 7/2023 | Magcale | ................. | G06F 16/23 |
| | | | | 714/704 |
| 2008/0024949 A1 * | 1/2008 | Kulkarni | ............. | G06F 11/1415 |
| | | | | 361/111 |
| 2012/0011315 A1 * | 1/2012 | Ishizaki | ................ | G06F 3/0689 |
| | | | | 711/E12.016 |
| 2014/0201555 A1 * | 7/2014 | Balasubramanian | ........................ | |
| | | | | G06F 3/0689 |
| | | | | 713/324 |
| 2016/0283340 A1 * | 9/2016 | Susarla | ................. | G06F 3/0689 |
| 2020/0250026 A1 * | 8/2020 | Popelka | ............. | G06F 11/0769 |
| 2020/0302722 A1 * | 9/2020 | Budman | ................. | H04L 63/08 |
| 2020/0327038 A1 * | 10/2020 | Mola | .................... | G06F 11/3636 |
| 2021/0279188 A1 * | 9/2021 | Goss | ................... | G06F 12/0246 |
| 2022/0036133 A1 * | 2/2022 | Wigglesworth | ...... | G06F 11/302 |

(Continued)

OTHER PUBLICATIONS

Guo et al. "LogBERT: Log Anomaly Detection via BERT", Mar. 7, 2021 (Year: 2021).*

(Continued)

*Primary Examiner* — Sarai E Butler
(74) *Attorney, Agent, or Firm* — Daly, Crowley, Mofford & Durkee, LLP

(57) ABSTRACT

A method, comprising: obtaining a parsed trace log that is generated by parsing a raw trace log of a storage system, the parsed trace log identifying a first sequence of tasks that are executed as part of a same input-output (I/O) operation; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code.

20 Claims, 6 Drawing Sheets

(56) References Cited

U.S. PATENT DOCUMENTS

2022/0113938 A1\* 4/2022 Jha .................... G06F 11/076
2023/0259755 A1\* 8/2023 O'Donncha ........... G16Y 40/20
  706/3
2023/0297461 A1\* 9/2023 Biswal ............... G06F 11/3423
  714/38.1

OTHER PUBLICATIONS

Guo et al. "LogBERT: Log Anomaly Detection via BERT", Mar. 7, 2021, 13 pages.

\* cited by examiner

ANOMALY CATALOG 222

310

| ANOMALY ID | THRESHOLD | KNOWLEDGE BASE ARTICLE ID | TRIAGE STATE |
|---|---|---|---|
| 123456 | 30% | ID_1 | COMPLETE |
| 345678 | 3% | ID_2 | COMPLETE |
| 432654 | 0% | ID_3 | COMPLETE |
| ANY | 10% | N/A | PENDING |

312A, 312B, 312C, 312D

320

| ANOMALY ID | SEQUENCE SIGNATURE |
|---|---|
| 123456 | SEQ_1 |
| 345678 | SEQ_2 |
| • • • • • • | |
| 432654 | SEQ_3 |

I/O PATH ANOMALY DETECTION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: obtaining a parsed trace log that is generated by parsing a raw trace log of a storage system, the parsed trace log identifying a first sequence of tasks that are executed as part of a same input-output (I/O) operation; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence is classified in the second category: abstaining from generating an alert.

According to aspects of the disclosure, a system is provided, comprising: a memory; and a processor that is operatively coupled to the memory, the processor being configured to perform the operations of: obtaining a parsed trace log that is generated by parsing a raw trace log of a storage system, the parsed trace log identifying a first sequence of tasks that are executed as part of a same input-output (I/O) operation; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence is classified in the second category: abstaining from generating an alert.

According to aspects of the disclosure, a non-transitory computer-readable medium is provided storing one or more processor-executable instructions, which, when executed by at least one processor, cause the at least one processor to perform the operations of: obtaining a parsed trace log that is generated by parsing a raw trace log of a storage system, the parsed trace log identifying a first sequence of tasks that are executed as part of a same input-output (I/O) operation; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence is classified in the second category: abstaining from generating an alert.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of an anomaly catalog, according to aspects of the disclosure;

DETAILED DESCRIPTION

Figure 1:
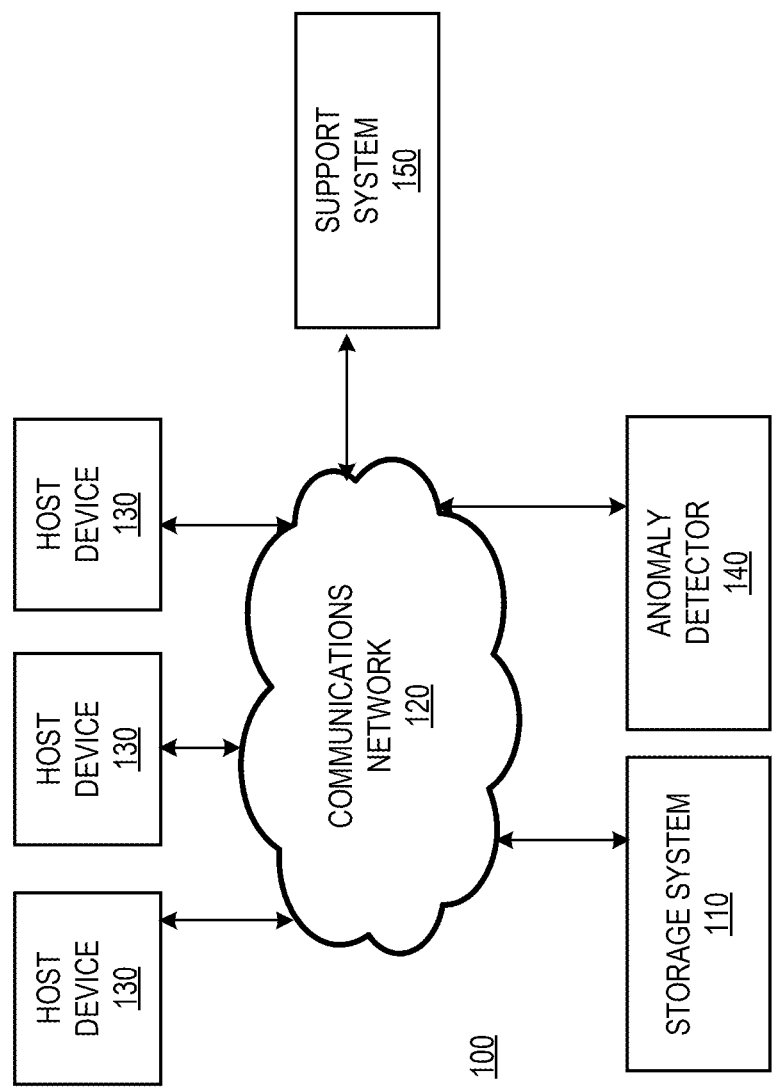
FIG. 1 is a diagram of an example of a system, according to aspects of the disclosure.

FIG. 1 is a diagram of an example of a system 100, according to aspects of the disclosure. As illustrated, system 100 may include a plurality of host devices 130 that are coupled via a communications network 120 to a storage system 110, an anomaly detector 140, and a support system 150. Each of the host devices 130 may include one or more of a desktop computer, a smartphone, a laptop, and/or any other suitable type of computing device. The communications network 120 may include one or more of a local area network (LAN), a wide area network (WAN), a wireless network, a cellular network, a 5G network, the Internet, an InfiniBand network, and/or any other suitable type of network. The storage system 110 may include any suitable type of storage system, such as a location-addressable storage system or a content-addressable storage system, for example. The anomaly detector 140 may include a computing system for detecting anomalies in the operation of the storage system 110 and reporting any detecting anomalies to support system 150. Support system 150 may include one or more computing systems that are used by customer support personnel (or QA personnel) to fix bugs or other errors that are detected in the operation of storage system 110. In some implementations, support system 150 may include a database for tracking support requests (e.g., bug reports or troubleshooting requests), as well as a knowledge database that contains information about known bugs/errors, as well as information on how to resolve the bugs or errors. The knowledge database may include a plurality of entries, each entry may include an article ID and an article. The article ID is also referred to as a "knowledge base article ID". The article identified in each entry may include text (e.g., a bullet list or free text) that outlines a set of steps that need to be performed by system administrators in order to resolve a particular problem. In other words, the article may include a troubleshooting guide for a particular problem. Additionally or alternatively, the article may include other information, such as frequently asked questions about the problem, a summary of best practices for preventing the problem from occurring, user feedback, and/or any other suitable type of information that is customarily found in knowledge databases that are maintained by software developers. Portion 310 of anomaly catalog 222 (shown in FIG. 3) includes different knowledge base article IDs that point to articles for resolving different anomalies. The term "anomaly" as used herein refers to abnormal behavior of storage system 110 that is caused by a software bug, misconfiguration, hardware failure, malware, and/or any other similar cause.

Figure 2:
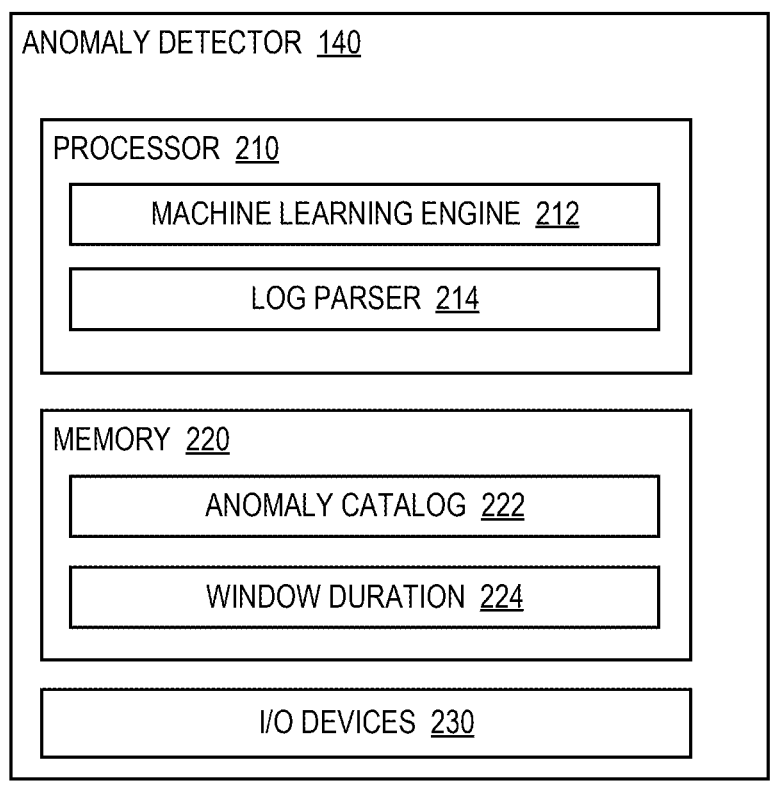
FIG. 2 is a diagram of an example of an anomaly detector, according to aspects of the disclosure.

FIG. 2 is a diagram of an example of anomaly detector 140, according to aspects of the disclosure. As illustrated, anomaly detector 140 may include a processor 210, a memory 220, and I/O devices 230. Processor 210 may include one or more of a general-purpose processor (e.g., an x86 processor or a RISC-V processor), a field programmable gate array (FPGA), a graphics processing unit (GPU), an artificial intelligence (AI) accelerator, an application-specific integrated circuit (ASIC), and/or any other suitable type of processing circuitry. Memory 220 may include any suitable type of volatile or non-volatile memory. By way of example, memory 220 may include a solid-state drive (SSD), a hard disk, a random-access memory, an electronically erasable programmable read-only memory (EEPROM), double data rate (DDR) random-access memory (RAM), or synchronous dynamic random-access memory (SDRAM). The I/O devices 230 may include one or more of an Ethernet adapter, a Bluetooth adapter, a 5G adapter, a WiFi (802.11) adapter, a mouse, a keyboard, a camera, a microphone, and/or any other suitable type of I/O device.

Processor 210 may be configured to execute a machine learning engine 212. According to the present example, machine learning engine 212 implements the LogBERT model which is described in the paper titled "LogBERT: Log Anomaly Detection via BERT", published in the 2021 International Joint Conference on Neural Networks (IJCNN), and authored by Haixuan Guo et al., which is hereby incorporated by reference herein in its entirety. In operation, machine learning engine 212 may receive as input an indication of a sequence of tasks that are performed by storage system 110 as part of the same I/O operation and classify the sequence in one of a first category and a second category. Under the nomenclature of the present disclosure, the first category is also referred to as "anomalous category" and the second category is also referred to as a "non-anomalous category". When the sequence is classified in the first category, this may be an indication that storage system 110 is exhibiting anomalous behavior which could be a sign of a problem in storage system 110. When the sequence is classified in the second category, this may be an indication that storage system 110 is operating normally—i.e., without deviations from its expected behavior. Although, in the present example, machine learning engine 212 implements LogBert, the present disclosure is not limited to engine 212 implementing any specific model.

Log parser 214 may receive as input a trace log of storage system 110 and parse the log into one or more sequences of tasks. Each sequence of tasks may contain identifiers of tasks that are performed as part of the same I/O operation. As used herein, an I/O operation may refer to one or more of a read operation, a write operation, a delete operation, a move operation, and/or any other suitable type of I/O operation that is customarily requested (by users or host devices) to be performed on data that is stored in a storage system. In general, when an I/O request is received at storage system 110, the request is broken into tasks and each task is executed and logged separately. For example, over the course of executing a read request, storage system 110 may identify a plurality of tracks (or another type of logical units) that make the requested data. The storage system may perform various operations that are aimed at retrieving data stored in the tracks.

Table 1 below provides an example of different tasks that may be performed and logged when a read I/O request is executed by storage system 110. The left column identifies tasks that are performed when a read request results in a cache miss with error, the middle column identifies tasks that are performed when the read request results in a cache miss without error, and the right column identifies tasks that are performed when the I/O request results in a cache hit.

TABLE 1

| Read Miss with Error | Read Miss without Error | Read Hit |
|---|---|---|
| Receive the command | Receive the command | Receive the command |
| Iterate over each track | Iterate over each track | Iterate over each track |
|   Read the track metadata |   Read the track metadata |   Read the track metadata |
|   Check if the track is in cache |   Check if the track is in cache |   Check if the track is in cache |
|   Else |   Else |   Lock the track |
|     Build a request for the back end to read the data |     Build a request for the back end to read the data |   Send the data to the host |
|     Failure to read from local, retry remote mirror for metadata |     Get a response from the back end and then restart the iterator on this track |   Unlock the track |
|     Wait on response | Send status to the host | Send status to the host |
|     Get a response from the back end and then restart the iterator on this track | | |
| Send status to the host | | |

Table 2 below identifies different sequences of operations that are retrieved from the trace log of storage system 110.

Each column in Table 2 identifies a different set of tasks that are performed by storage system 110 as part of executing different I/O operations. The left column of Table 2 identifies a first sequence of tasks which is referred to as "sequence 1". The first sequence of tasks is performed as part of executing a first I/O operation. Each line in the left column of Table 2 identifies the name of a different task that is performed by storage system 110 as part of executing the first I/O operation. Each line in the left column of Table 2 includes text that is retrieved (or otherwise obtained) by log parser 214 from the trace log of storage system 110. The right column of Table 2 identifies a second sequence of tasks which is referred to as "sequence 2". The second sequence of tasks is performed as part of executing a second I/O operation. Each line in the right column of Table 2 identifies the name of a different task that is performed by storage system 110 as part of executing the first I/O operation. Each line in the right column of Table 2 includes text that is retrieved (or otherwise obtained) by log parser 214 from the trace log of storage system 110. The term "trace log of storage system 110" refers to a log where different tasks that are performed by storage system 110 (over the course of executing I/O operations) are logged. An example of a trace log portion is provided in the Appendix to the present application.

TABLE 2

| % LEFT COLUMN % SEQUENCE 1 | % RIGHT COLUMN % SEQUENCE 2 |
|---|---|
| ALLOC Q REC A3............ | ALLOC Q REC A3............ |
| COMMAND CDB.............. | COMMAND CDB.............. |
| SCSI SIO Message........... | SCSI SIO Message........... |
| IO PARMS A/ID/H/C/DPTR ... | Task Records List........... |
| SADT in SID/ID/TSIZE/QRE | Task Records List........... |
| DMA INT JOB................ | IO PARMS A/ID/H/C/DPTR... |
| THIN DEVICE EVENT.......... | SADT in SID/ID/TSIZE/QRE |
| ENDING STATUS/STAT/CHSTATL. | DMA INT JOB................ |
| DISCONNECT................. | THIN DEVICE EVENT.......... |
| RMV Q ENTRY................ | ENDING STATUS/ |
| FREE Q REC TAG/COUNT/A3... | STAT/CHSTATL. |
| | DISCONNECT................. |
| | RMV Q ENTRY................ |
| | FREE Q REC TAG/COUNT/A3... |

Table 3 below identifies respective signatures for the first and second sequence of tasks that are listed in Table 2. The left column of Table 3 includes a signature for the first sequence (i.e., sequence 1). As illustrated, the signature for the first sequence of tasks may include a numerical vector, where each element in the vector is an identifier of a different one of the tasks in the sequence. The right column of Table 3 includes a signature of the second sequence of tasks (i.e., sequence 2). As illustrated, the signature for the first sequence of tasks may include a numerical vector, where each element in the vector is an identifier of a different one of the tasks in the sequence. The numerical identifier for each of the tasks may be identified by using a dictionary (not shown) that is stored in memory 220 which identifies the respective numerical identifier for each of a plurality of tasks. The dictionary may map the numerical identifiers for the tasks to the names of the tasks. In the example of Tables 2 and 3, the name of a task is "ALLOC Q REC A3" and the numerical identifier for the task is 0xe9. In the example of Tables 2 and 3, the name of a task is "ALLOC Q REC A3" and the numerical identifier for the task is 0xE9. In the example of Tables 2 and 3, the name of another task is "DISCONNECT" and the numerical identifier for the task is 0xB.

TABLE 3

| % LEFT COLUMN % SEQUENCE 1 | % RIGHT COLUMN % SEQUENCE 2 |
|---|---|
| ('e9', '2a', 'eb', '6e', '30', '21', '75', '2', 'b', 'e4', 'ea') | ('e9', '2a', 'eb', '3', '3', '6e', '30', '21', '75', '2', 'b', 'e4', 'ea') |

Memory 220 may store an indication 224 of a window duration. Indication 224 may be a configuration setting of anomaly detector 140, which is entered manually. Indication 224 may be used by log parser 214 in identifying tasks that correspond to the same operation. When a request to perform a particular I/O operation is received at storage system 110 from one of host devices 130, the I/O request is assigned a job number. The job number is selected from a pool of available job numbers, and it corresponds to a memory space that would be used for serving the I/O request. The job number, as well as other job numbers in storage system 110, is recycled and will be assigned to another I/O request in the future. In other words, the same job number may correspond to different I/O requests. For each task that is listed in the trace log of storage system 110, the trace log may identify the job number for the I/O operation that is associated with the task. Under the nomenclature of the present disclosure, an I/O operation is associated with a task (and vice versa) if the task is performed as part of executing the I/O operation. In other words, log parser 214 may identify the sequence of tasks that are associated with the same I/O operation by scanning the trace log to identify all tasks that are mapped to the job number for the I/O operation.

As noted above, multiple I/O operations may be given the same job number. Thus, to identify the tasks that are associated with the same I/O operation, log parser 214 may identify tasks that are mapped to the same job number and performed in close temporal proximity to each other. Specifically, log parser 214 may identify a sequence of tasks that are performed as part of a given I/O operation by processing the trace log of storage system 110 to identify all tasks that are: (i) performed in the time window starting when a request to perform the given I/O operation is received and having the duration that is specified by indication 224, and (ii) which have the job number that is allocated to the I/O operation. In other words, log parser 214 may use a windowing mechanism to distinguish between tasks associated with different I/O operations that are given the same job number. The duration of the window may depend on the particular context in which anomaly detector 140 is deployed and would depend on the total number of available job numbers, the latency of the storage system, etc. Put differently, the duration of the window may depend on the average time it takes to complete an I/O operation and the average time that passes before the same job number is assigned to a new I/O request. It will be clear to those of ordinary skill in the art, after reading the present disclosure, how to determine the value of indication 224 of window duration.

Notably, the signature for a sequence of tasks may indicate the order in which the tasks are performed. In this regard, in each signature, the task identifiers may be arranged in the order in which are performed, such that the identifier of the first task of the sequence is first, the identifier of the last task in the sequence is last, and the identifier of any other given task in the sequence is positioned (in the signature) after the identifiers for tasks in the sequence that are performed before the given task and before the identifiers of tasks in the sequence that are performed after the given task.

Furthermore, memory 220 may store an anomaly catalog 222. An example of anomaly catalog 222 is provided in FIG. 3. As illustrated, anomaly catalog 222 may include a portion 310 and a portion 320. Portion 320 may map each of a plurality of task sequence signatures (such as those shown in Table 3) to a different one of a plurality of anomaly IDs. Portion 320 may include a plurality of entries 322. Each entry 322 may include a respective anomaly ID and a respective task sequence signature. As noted above, when a task sequence (or task sequence signature) is classified as anomalous by machine learning engine 212, portion 320 may be used to determine an anomaly ID corresponding to the task sequence.

Portion 310 of anomaly catalog 222 may include entries 312A-D. Each entry 312A-C may include an anomaly ID that corresponds to an anomaly, a threshold rate for the anomaly, a knowledge base article ID, and an indication of the triage state of the anomaly ID (or corresponding anomaly). The threshold rate for the anomaly specifies a minimum rate at which an anomaly needs to occur in order for the anomaly to be reported to support system 150 (or another entity). For example, in the context of entry 312A, a threshold rate of "30%" may mean that the anomaly having the ID of '123456' must be detected in 30% of scanned sequence signatures (e.g., 30% of the signatures in a given set or 30% of the signatures that are classified during a period of time) before an alert for the anomaly is generated. The knowledge base article ID in each entry 312 may identify a knowledge base article containing information for addressing the cause of the anomaly that is associated with the entry. In the context of entry 312A, the knowledge base article having ID_1 may contain information for addressing the software bug or software misconfiguration that gives rise to anomalous behavior of storage system 110 which has the anomaly ID '123456'. The triage state of each anomaly/anomaly ID may be "complete" or "pending". When the triage state of an anomaly (or anomaly ID) is 'complete', that means that the anomaly (or anomaly ID) is assigned a knowledge base article ID that could be used by support personnel to address the anomaly.

In the example of FIG. 3, entry 312A indicates that anomaly ID '123456' is associated with a threshold rate of 30%, knowledge base article ID "ID_1, and a 'complete' triage state. Entry 312B indicates that anomaly ID '345678' is associated with a threshold rate of 3%, knowledge base article ID "ID_3, and a 'complete' triage state. Entry 312C indicates that anomaly ID '432645' is associated with a threshold rate of 0%, knowledge base article ID "ID_3, and a 'complete' triage state. The threshold of '0%' in this example means that an alert would be generated for anomaly ID '432645' even if the anomaly is detected only once. Entry 312D means that any anomaly ID, other than the anomaly IDs explicitly listed in portion 310, has a threshold rate of 10% and an a 'pending' triage state.

Figure 4:
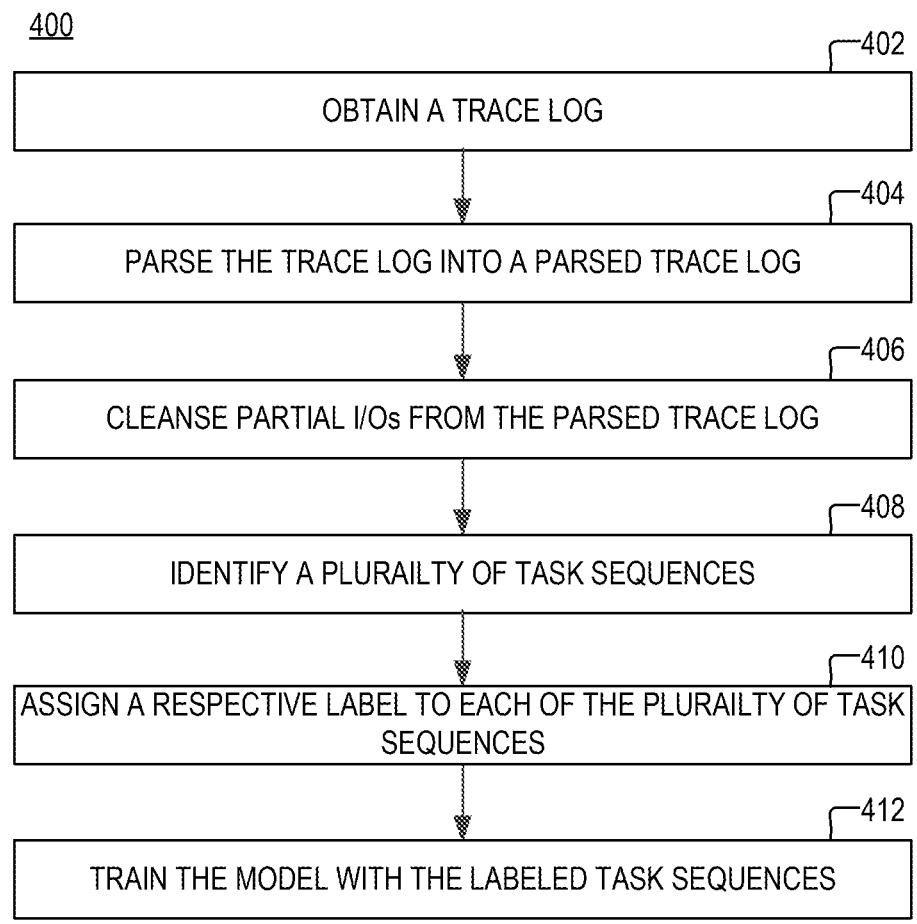
FIG. 4 is a flowchart of an example of a process, according to aspects of the disclosure.

FIG. 4 is a flowchart of an example of a process 400 for training the model that is implemented by machine learning engine 212. At step 402, anomaly detector 140 obtains a trace log of storage system 110. The obtained trace log may be the same or similar to the trace log example provided in the Appendix to the present disclosure. At step 404, anomaly detector 140 parses the trace log into a parsed trace log. Parsing the trace log may include imparting any structure on the trace log that is suitable for performing steps 406 and 408. In some implementations, parsing the trace log may include removing from the trace log any entries that are not associated with tasks that are performed as part of executing an I/O operation and/or removing any other information that is not necessary. In some implementations, parsing the trace log may yield a list of tasks that are identified in the manner shown in Table 2, along with a job number and timestamp for each task. At step 406, anomaly detector 140 processes the parsed trace log to remove entries corresponding to tasks associated with incomplete I/O operations. In general, when an I/O operation is completed, the trace log would contain an indication to this effect. In this regard, the parsed trace log may be scanned to identify tasks that are associated with I/O operations for which a completion acknowledgment (or an error) is missing from the log. At step 408, anomaly detector 140 processes the parsed trace log to identify a plurality of task sequences. Each of the task sequences may correspond to a different I/O operation that has been completed. Each of the task sequences may be identified in the manner discussed above with respect to FIG. 2. In some implementations, identifying any of the task sequences may include generating a signature for the task sequence. The signature may be the same or similar to the signatures that are discussed above with respect to Table 3. At step 410, anomaly detector 140 assigns a respective label to each of the task sequences. The respective label that is assigned to any of the task sequences (or sequence signatures) may indicate that the sequence (or sequence signature) belongs to one of the "anomalous" or "non-anomalous" categories. At step 412, the model implemented by machine learning engine 212 is trained by using the plurality of task sequences (identified at step 408) and the labels (assigned at step 410).

Figure 5A:
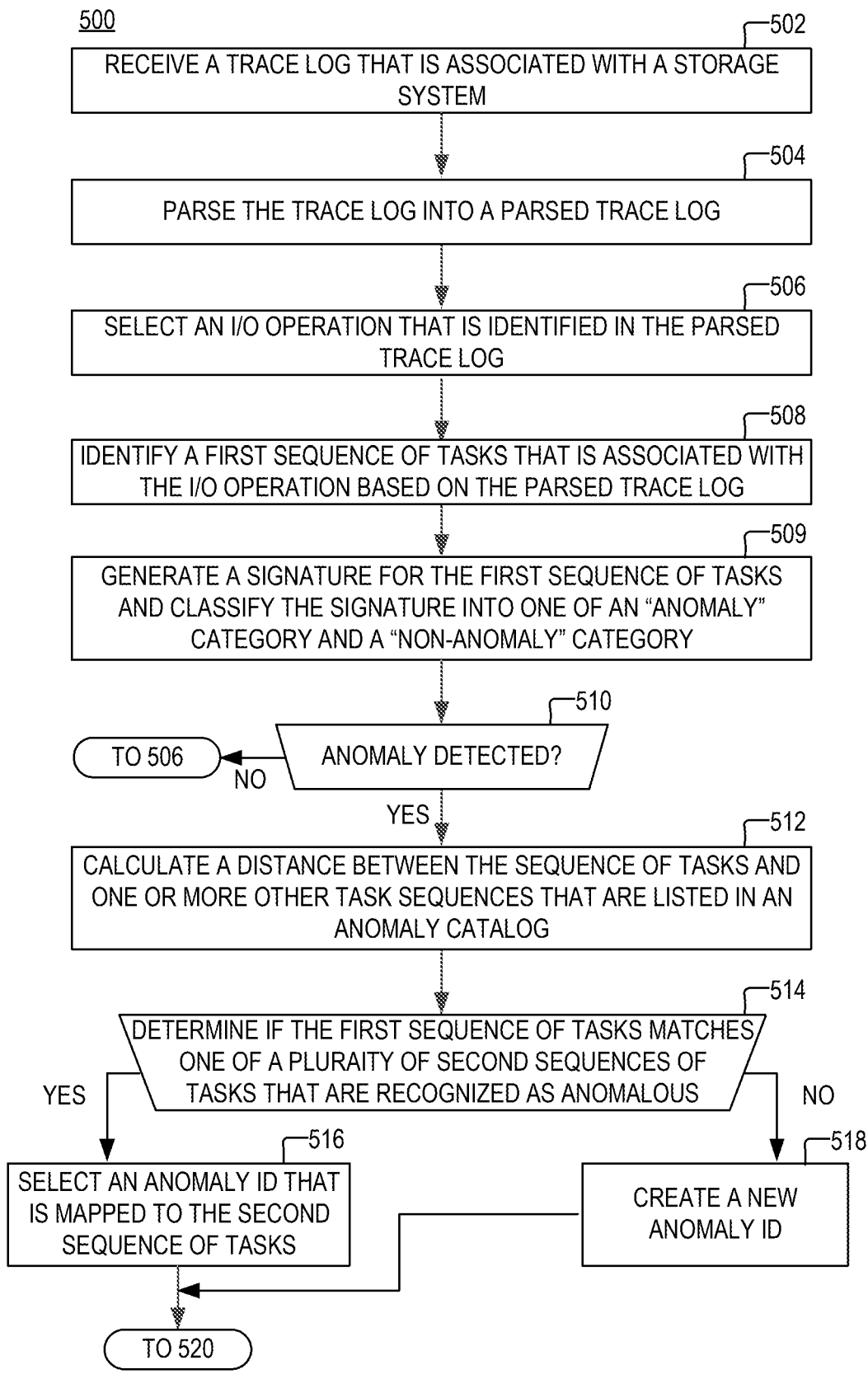
FIG. 5A is a flowchart of an example of a process, according to aspects of the disclosure.
Figure 5B:
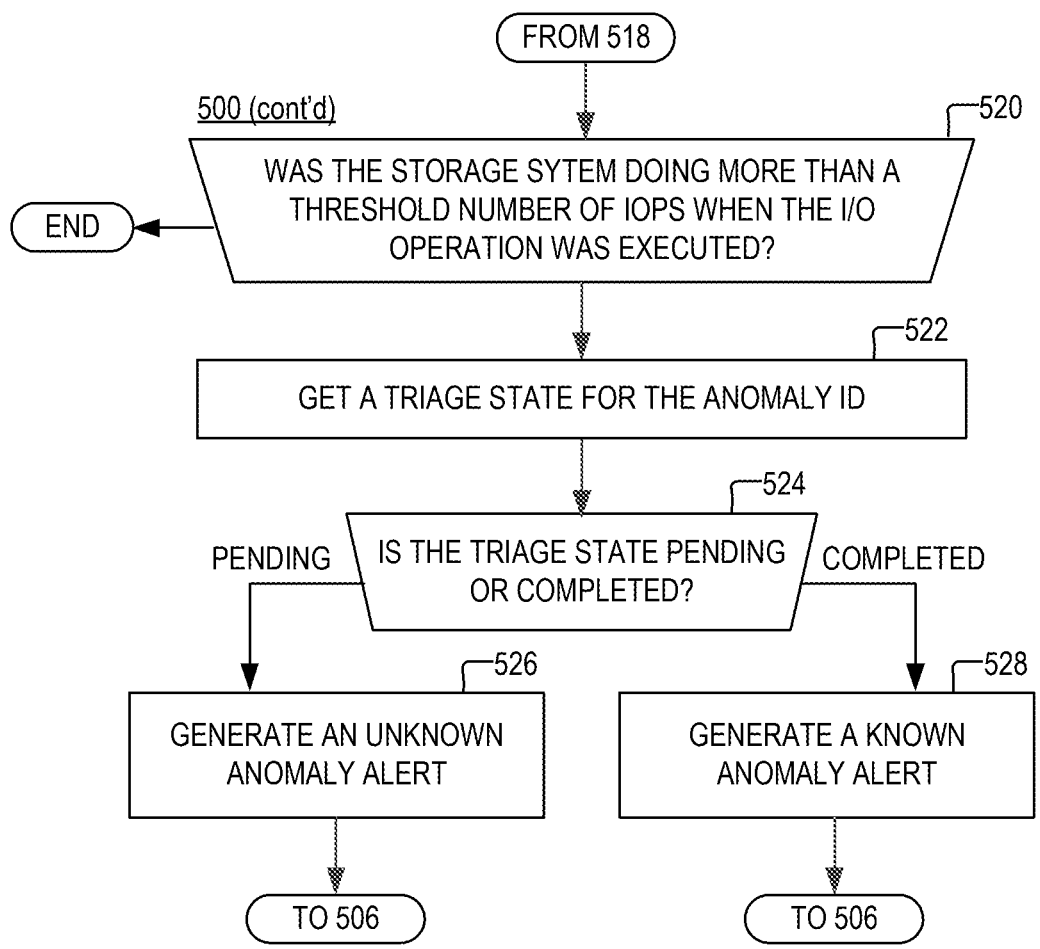
FIG. 5B is a flowchart of an example of a process, according to aspects of the disclosure.

FIGS. 5A-B show a flowchart of an example of a process 500, according to aspects of the disclosure.

At step 502, anomaly detector 140 receives a trace log from storage system 110.

At step 504, anomaly detector 140 parses the trace log into a parsed trace log. The parsing performed at step 504 may involve imparting any structure on the trace log that is suitable for performing steps 506-509. The obtained trace log may be the same or similar to the trace log example provided in the Appendix to the present disclosure. In some implementations, parsing the trace log may include removing from the trace log any entries that are not associated with tasks that are performed as part of executing an I/O operation and/or removing any other information that is not necessary. In some implementations, parsing the trace log may yield a list of tasks that are identified in the manner shown in Table 2, along with a job number and timestamp for each task. Furthermore, at step 504, tasks associated with incomplete (i.e., partially completed) I/O operations may be removed.

At step 506, anomaly detector 140 selects an I/O operation that is identified in the trace log. In some implementations, selecting the I/O operation may include identifying a job number associated with the operation and or identifying an entry in the trace log that indicates that a request to perform the selected I/O operation is received at storage system 110. In some implementations, anomaly detector 140 may select only an I/O operation that has not been selected during an earlier iteration of step 506. In some implementations, if anomaly detector 140 determines (at step 506) that all I/O operations identified in the trace log have been selected once, process 500 may end.

At step 508, anomaly detector 140 identifies a sequence of tasks that are associated with the selected I/O operation. The sequence of tasks may be identified in the manner discussed above with respect to FIG. 2. Specifically, anomaly detector 140 may identify a job number corresponding to the selected I/O operation. Next, anomaly detector 140 may identify the time when a request to perform the I/O operation is received. Next, anomaly detector 140 may retrieve the indication 224 of window duration from memory 220. And finally, anomaly detector 140 may identify all (or at least some) of the tasks that are: (i) identified in the trace log as being associated with the job number of the I/O operation and (ii) identified in the trace log as being performed during the time window starting when the request to perform the I/O operation is received and having the duration that is specified by the indication 224 of window duration.

At step 509, anomaly detector 140 generates a signature for the identified sequence of tasks and classifies the signature with the model that is implemented by machine learning engine 212. The signature may be generated in the manner discussed above with respect to FIG. 2. The signature may be the same or similar to any of the signatures discussed above with respect to Table 3. The signature may be classified into one of the "anomalous" or "non-anomalous" categories.

At step 510, anomaly detector 140 determines whether an anomaly is detected as a result of the classification. If the signature is classified into the anomalous category, anomaly detector 140 may determine that an anomaly has been detected, and process 500 may proceed to step 512. Otherwise, if the signature is classified into the non-anomalous category, anomaly detector 140 may determine that no anomaly has been detected, and process 500 may return to step 506.

At step 512, anomaly detector 140 calculates a plurality of distances, wherein each of the distances is the respective distance between the sequence signature (generated at step 509) and a different one of the sequence signatures identified in portion 320 of anomaly catalog 222. In some implementations, each calculated distance may be a Levenshtain distance.

At step 514, anomaly detector 140 determines whether the task sequence (identified at step 508) matches any of the task sequences identified in portion 320 of anomaly catalog 222. In some implementations, anomaly detector 140 may determine if the distance between the sequence signature (generated at step 509) and any of the sequence signatures identified in portion 320 is less than a predetermined threshold. If at least one of the distances calculated at step 512 is below the threshold, anomaly detector 140 determines that there is a match, and process 500 proceeds to step 516. Otherwise, if none of the distances calculated at step 512 is less than the threshold, process 500 proceeds to step 518.

Additionally or alternatively, in some implementations, anomaly detector 140 may identify (at step 514) the smallest one of the distance values (determined at step 512). When the smallest value is greater than or equal to the threshold, process 500 may proceed to step 518. Otherwise, when the smallest value is below the threshold, process 500 may proceed to step 516.

At step 516, anomaly detector 140 identifies a matching sequence of tasks and obtains an anomaly ID for the matching sequence of tasks. In instances in which only one of the distances calculated at step 512 is below the threshold, the matching sequence of tasks may be one of the sequences in portion 320 whose signature has yielded the distance that is below the threshold. If more than one of the distances calculated at step 512 is below the threshold, the matching sequence of tasks may be one of the sequences in portion 320 whose signature has yielded the distance that is the smallest among all of the distances falling below the threshold. The anomaly ID for the matching sequence of tasks may be an anomaly ID that is part of the same entry 322 (shown in FIG. 3) as the signature of the matching sequence of tasks.

At step 518, anomaly detector 140 creates a new anomaly ID and assigns the new anomaly ID to the task sequence (identified at step 508). The new anomaly ID is different from any of the anomaly IDS identified in portions 310 and 320 of anomaly catalog 222. After the new anomaly ID is generated, anomaly detector 140 generates a new entry 322 that includes the new anomaly ID and the task sequence signature (generated at step 509) and adds the new entry 322 to portion 320 of anomaly catalog 222.

At step 520, anomaly detector 140 detects whether storage system 110 was doing more than a threshold number of I/Os per second (IOPS) when the I/O operation (selected at step 509) was performed. If the storage system was doing less than the threshold number of IOPs, process 500 returns to step 506. Otherwise, process 500 proceeds to step 522.

At step 522, anomaly detector 140 retrieves the triage state for the anomaly ID. Depending on the flow of process 500, the anomaly ID in question may be the anomaly ID retrieved at step 516 or the new anomaly ID assigned at step 518.

At step 524, anomaly detector 140 determines if the triage state (retrieved at step 522) is 'pending' or 'completed'. If the triage state is 'pending', process 500 proceeds to step 526. If the triage state is 'completed', process 500 proceeds to step 528.

At step 526, anomaly detector 140 generates an unknown anomaly alert, after which process 500 returns to step 506. Generating the unknown anomaly alert may include one or more of generating a message, a database entry, a number, a string, or an alphanumerical string, which indicates that an unknown anomaly has been detected in the operation of storage system 110. In some implementations, the alert may include the anomaly ID. Depending on the flow of process 500, the anomaly ID in question may be the anomaly ID retrieved at step 516 or the new anomaly ID assigned at step 518.

Additionally or alternatively, generating the unknown anomaly alert may include one or more of: storing the unknown anomaly alert in a database from which it can be retrieved and examined by customer support personnel (or QA personnel). Alternatively, generating the unknown anomaly alert may include transmitting the alert, over communications network 120, to a computing system, such as support system 150, which is operated by customer support personnel (or QA personnel). Additionally or alternatively, generating the unknown anomaly alert may include transmitting the alert to a predetermined email address that is monitored by customer support personnel (or QA personnel).

In some implementations, step 526 may be performed only when the rate of occurrence for the anomaly ID (identified at step 516 or 518) exceeds the threshold rate for the anomaly ID that is specified in portion 310 of anomaly catalog 222. The rate of occurrence may be based on the number of times the anomaly ID is matched to a sequence signature during a predetermined time window (or during the processing of a particular signature set). An example of calculating the rate of occurrence is provided further below.

At step 528, anomaly detector 140 generates a known anomaly alert, after which process 500 returns to step 506. Generating the known anomaly alert may include one or more of generating a message, a database entry, a number, a string, or an alphanumerical string, which indicates that an unknown anomaly has been detected in the operation of storage system 110. In some implementations, the known anomaly alert may include the anomaly ID. Depending on the flow of process 500, the anomaly ID in question may be the anomaly ID retrieved at step 516 or the new anomaly ID assigned at step 518. Furthermore, unlike the unknown anomaly alert, the known anomaly alert may include a knowledge base article ID that is associated with the anomaly ID. The knowledge base article ID may be part of the same entry 312 in portion 310 of anomaly catalog 222 as the anomaly ID. Including the knowledge base article ID in the known anomaly alert is advantageous because it may help customer support personnel (or QA personnel) to find information that would be helpful in troubleshooting the anomaly.

Additionally or alternatively, generating the known anomaly alert may include one or more of: storing the known anomaly alert in a database from which it can be retrieved and examined by customer support personnel (or QA personnel). Alternatively, generating the known anomaly alert may include transmitting the alert, over communications network 120, to a computing system, such as support system 150, which is operated by customer support personnel (or QA personnel). Additionally or alternatively, generating the known anomaly alert may include transmitting the alert to a predetermined email address that is monitored by customer support personnel (or QA personnel).

In some implementations, step 528 may be performed only when the rate of occurrence for the anomaly ID (identified at step 516 or 518) exceeds the threshold rate for the anomaly ID that is specified in portion 310 of anomaly catalog 222. The rate of occurrence may be based on the number of times the anomaly ID is matched to the signature for a sequence of tasks during a predetermined time window (or during the processing of a particular signature set). An example of calculating the rate of occurrence is provided further below.

As noted above, the known and unknown anomaly alerts may differ in that the known anomaly alert may include a knowledge base article ID, whereas the unknown anomaly alert would never include a knowledge base article ID. Additionally or alternatively, the known and unknown anomaly alerts may differ in that they are transmitted to different recipients (e.g., different email addresses). Additionally or alternatively, the known and unknown anomaly alerts may differ in that they are transmitted to different support systems. Additionally or alternatively, the known and unknown anomaly alerts may differ in that they are stored in different databases.

FIGS. 5A-B are provided as an example only. At least some of the steps in process 500 may be performed in a different order, in parallel, or altogether omitted. For example, in some implementations, step 520 may be omitted.

An example of an alternative implementation of process 500 is now described in further detail. In the alternative implementation, at least some of the steps in process 500 may be performed by storage processors in storage system 110. A storage process may be a computing device having a processor, memory, power supply, as well as other components, which is part of storage system 110 and which executes I/O requests. An example of storage processors that are part of a storage system is provided in U.S. Pat. No. 11,805,039, entitled "METHOD AND APPARATUS FOR DETECTING DEGRADED NETWORK PERFORMANCE", which is hereby incorporated by reference herein in its entirety.

As can be readily appreciated, the trace log (discussed with respect to step 502) may be very large. In this regard, in a preferred implementation, the decomposition of the trace log into task sequences may be performed by one or more storage processors in storage system 110. In other words, in the preferred implementation, one or more storage processors in storage system 110 may perform (at least a portion of) steps 502-509 of process 500 locally. As a result of performing steps 502-509 locally, the one or more storage processors may generate a plurality of task sequence signatures (hereinafter "signature set"), after which the one or more processors may transmit the signature set to anomaly detector 140 for classification and further processing. Depending on the implementation, the term "trace log" may refer to a single trace log that is updated collectively by a plurality of storage processors or a collection of trace logs each of which is updated by only one of the storage processors.

Upon receiving the set of signatures, anomaly detector 140 may first classify and match to a respective anomaly ID each of the signatures in the signature set. The phrase matching a signature to an anomaly ID refers to performing, for the signature, the portion of process 500 that includes the classification part of step 509, steps 512-510 and possibly one of steps 516 and 518. for each of the signatures in the signature set. In other words, when this stage is completed, the anomaly detector 140 would have identified a subset of the signature set that contains only signatures that are classified in the anomalous category, wherein each of the signatures in the subset is matched to a respective anomaly ID. As can be readily appreciated, the subset would not include signatures classified in the non-anomalous category as those signatures are not assigned an anomaly ID. The present example assumes that the subset is non-empty.

Next, anomaly detector 140 may generate a report on I/O composition percentages. The report may identify the rate of occurrence of each anomaly ID in the subset. For example, if 3 of the signatures in the subset are matched to anomaly ID '123456', the rate of occurrence of the of anomaly ID (or associated anomaly) would be equal to 3 divided by N (i.e., (3/N)*100). According to the present example, N is equal to the size of the set of signatures. However, alternative implementations are possible in which N is equal to the subset of the set of signatures, which includes only signatures that are classified in the anomalous category. In general, the rate of occurrence of any anomaly ID (or associated anomaly) that is represented in the subset may be calculated by using the formula (M/N)*100 where M is the number of signatures in the subset (or set) that are matched to the anomaly ID (as a result of executing steps 512-514 and one of steps 516-518) and M is either the size of the signature set or its subset.

Next, anomaly detector 140 may identify the respective threshold rate for each of the anomaly IDs that are represented in the subset. The threshold rate may be retrieved from portion 310 of anomaly catalog 222.

Next, anomaly detector 140 may identify those of the anomaly IDs represented in the subset whose rate of occurrence exceeds their respective threshold rate. An anomaly ID is represented in the subset if at least one of the signatures in the subset is matched to the anomaly ID. And finally, for each of the identified anomaly IDs, anomaly detector 140 may generate an alert. In some implementations, the generated alerts may be separate from each other, or they may be integrated with each other. When the generated alerts are integrated with each other, they may be one big message (or data item) that includes all anomaly IDs whose rate of occurrence exceeds their respective threshold rate, as well as corresponding knowledge base article IDs when available. The message may be transmitted to support system 150, stored in a dataset, or emailed.

FIGS. 1-5B are provided as an example only. In some embodiments, an I/O request may refer to a data read or write request. At least some of the steps discussed with respect to FIGS. 1-5B may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. In some embodiments, the term "I/O request" or simply "I/O" may be used to refer to an input or output request.

The term "parse" may refer to any processing of a trace log that is performed at one of steps 504, 506, 508, and 509. The phrase "abstaining from generating an alert" for a particular task sequence may refer to discarding a representation of the sequence from memory without generating an alert, returning to step 506 of process 500, ending process 500, or stopping the processing the task sequence and beginning to work on (or process) a different task sequence.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range. The acronym QA as used throughout the disclosure stands for "quality assurance".

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

APPENDIX

| Tag | Dir | Thrd | Timestamp | ID | Message | M/LP | Pt | Vol. | QRECix |
|---|---|---|---|---|---|---|---|---|---|
| -------- | --- | ---- | ------------ | --- | -------------------------- | ---- | -- | ----- | ------ |
| -------- | 2b | 1 | ???????????? | 65 | TIMER...................... update_task_time | FFFF | FF | FFFFF | FFFFFF 08 7EDD DEC/14/23 03:09:35 |
| -------- | 1c | B | 0.000000 | 75 | THIN DEVICE EVENT.......... | 0000 | 00 | F001C | 0005A0 49 [0014 00000000] 00 0000 |

04699735
  00000000 00000000 61170000 26000000 00000000

| -------- | 1c | 12 | -0.000001 | eb | SCSI SIO Message........... | FFFF | FF | 00610 | FFFFFF |

2A000241 99620000 10000000 00000000 00000000 00000000 00000000
  2A0A8126 00006299 41020000 00001000 000000F0 28090400 0000000A 00000800
  04340000
  CDB=

| -------- | 1c | 6 | 0.000001 | 3 | Task Records List.......... | FFFF | FF | 00643 | FFFFFF 00 02 00 0001 00000000 |
| -------- | 1c | A | 0.000004 | eb | SCSI SIO Message........... | FFFF | FF | 00667 | FFFFFF |

2A000079 D3D50000 10000000 00000000 00000000 00000000 00000000 00000000
  2A021F08 0000D5D3 79000000 00001000 00000070 A9080400 00000005 00000800
  04340000
  CDB=

| 00000001 | 1c | 817C | 0.000015 | e9 | ALLOC Q REC A3............ | 0000 | 00 | 00661 | 0000A0 00 0FE8 0839E000 |

208D9340

| 00000002 | 1c | 8178 | 0.000016 | e9 | ALLOC Q REC A3............ | 0000 | 00 | 00618 | 000000 00 0FE7 0829F000 |

208158C0

| -------- | 1c | E | 0.000010 | 2 | ENDING STATUS/STAT/CHSTATL. | 0000 | 00 | 00653 | 000780 00 0000 08E93000 |

0000 00000000

| -------- | 1c | 9 | 0.000010 | 3 | Task Records List.......... | 0000 | 00 | 0062D | 000460 00 02 00 0001 00000000 |
| 00000003 | 1c | 817A | 0.000011 | e9 | ALLOC Q REC A3............ | 0000 | 00 | 00649 | 0001E0 00 0FE9 0859C000 |

208E6900

| -------- | 1c | D | 0.000017 | eb | SCSI SIO Message........... | 0000 | 00 | 0066B | 0006E0 |

2A0000EC CD550000 10000000 00000000 00000000 00000000 00000000 00000000
  2A06C90F 000055CD EC000000 00001000 00000040 D9080400 0000E006 00000800
  04340000

The invention claimed is:

1. A method, comprising: obtaining a parsed trace log that is generated by parsing a raw trace log of a storage system, the parsed trace log identifying a first sequence of tasks that are executed as part of a same input-output (I/O) operation, the first sequence of tasks being identified based on a job number that has been allocated to an I/O operation and a window duration setting, such that the first sequence of tasks includes only tasks that are associated with the job number and performed during a predetermined time window, the job number corresponding to a memory space that is used for executing an I/O request, the predetermined time window having a duration specified by the window duration setting; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence of tasks is classified in the second category: abstaining from generating an alert.

2. The method of claim 1, wherein the first sequence of tasks includes a set of identifiers, each identifier corresponding to a different one of the tasks in the first sequence of tasks.

3. The method of claim 1, wherein the alert is generated only when a rate of occurrence of the anomaly code exceeds a predetermined threshold.

4. The method of claim 1, wherein classifying the first sequence of tasks includes generating a signature that encodes an order in which the tasks in the first sequence of tasks are executed and classifying the signature.

5. The method of claim 1, wherein parsing the raw trace log includes retrieving from a memory a configuration setting that identifies a predetermined duration, identifying a job number that is associated with the I/O operation, and identifying any tasks that are listed in the raw trace log as associated with the job number during a time window that has the predetermined duration.

6. The method of claim 1, wherein identifying the anomaly code that corresponds to the first sequence of tasks includes:
identifying a plurality of distance values, each distance value corresponding to a different one of a plurality of anomaly codes, each distance value measuring a distance between the first sequence of tasks and a different second sequence of tasks;
identifying a smallest one of the plurality of distance values;
when the smallest one of the plurality of distance values is less than or equal to a distance threshold, using the anomaly code that corresponds to the smallest one of the plurality of distance values as the anomaly code that corresponds to the first sequence of tasks;
when the smallest one of the plurality of distance values is greater than the distance threshold, instantiating a new anomaly code and using the new anomaly code as the anomaly code that corresponds to the first sequence of tasks.

7. The method of claim 1, wherein generating the alert includes retrieving, from the anomaly catalog, an identifier of a knowledge-based article and inserting the identifier of the knowledge-based article in the alert.

8. The method of claim 1, wherein the machine learning model includes LogBERT.

9. The method of claim 1, wherein the alert includes the anomaly code.

10. A system, comprising: a memory; and a processor that is operatively coupled to the memory, the processor being configured to perform the operations of: obtaining a parsed trace log that is generated by parsing a raw trace log of a storage system, the parsed trace log identifying a first sequence of tasks that are executed as part of a same input-output (I/O) operation, the first sequence of tasks being identified based on a job number that has been allocated to an I/O operation and a window duration setting, such that the first sequence of tasks includes only tasks that are associated with the job number and performed during a predetermined time window, the job number corresponding to a memory space that is used for executing an I/O request, the predetermined time window having a duration specified by the window duration setting; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence of tasks is classified in the second category: abstaining from generating an alert.

11. The system of claim 10, wherein the first sequence of tasks includes a set of identifiers, each identifier corresponding to a different one of the tasks in the first sequence of tasks.

12. The system of claim 10, wherein the alert is generated only when a rate of occurrence of the anomaly code exceeds a predetermined threshold.

13. The system of claim 10, wherein classifying the first sequence of tasks includes generating a signature that encodes an order in which the tasks in the first sequence of tasks are executed and classifying the signature.

14. The system of claim 10, wherein parsing the raw trace log includes retrieving from a memory a configuration setting that identifies a predetermined duration, identifying a job number that is associated with the I/O operation, and identifying any tasks that are listed in the raw trace log as associated with the job number during a time window that has the predetermined duration.

15. The system of claim 10, wherein identifying the anomaly code that corresponds to the first sequence of tasks includes:
 identifying a plurality of distance values, each distance value corresponding to a different one of a plurality of anomaly codes, each distance value measuring a distance between the first sequence of tasks and a different second sequence of tasks;
 identifying a smallest one of the plurality of distance values;
 when the smallest one of the plurality of distance values is less than or equal to a distance threshold, using the anomaly code that corresponds to the smallest one of the plurality of distance values as the anomaly code that corresponds to the first sequence of tasks;
 when the smallest one of the plurality of distance values is greater than the distance threshold, instantiating a new anomaly code and using the new anomaly code as the anomaly code that corresponds to the first sequence of tasks.

16. The system of claim 10, wherein generating the alert includes retrieving, from the anomaly catalog, an identifier of a knowledge-based article and inserting the identifier of the knowledge-based article in the alert.

17. The system of claim 10, wherein the machine learning model includes LogBERT.

18. The system of claim 10, wherein the alert includes the anomaly code.

19. A non-transitory computer-readable medium storing one or more processor-executable instructions, which, when executed by at least one processor, cause the at least one processor to perform the operations of: obtaining a parsed trace log that is generated by parsing a raw trace log of a storage system, the parsed trace log identifying a first sequence of tasks that are executed as part of a same input-output (I/O) operation, the first sequence of tasks being identified based on a job number that has been allocated to an I/O operation and a window duration setting, such that the first sequence of tasks includes only tasks that are associated with the job number and performed during a predetermined time window, the job number corresponding to a memory space that is used for executing an I/O request, the predetermined time window having a duration specified by the window duration setting; classifying the first sequence of tasks by using a machine learning model, the first sequence of tasks being classified into one of a first category and a second category, the first category corresponding to anomalous events, and the second category corresponding to non-anomalous events; when the first sequence of tasks is classified in the first category: identifying an anomaly code that corresponds to the first sequence of tasks and generating an alert that is associated with the anomaly code, the anomaly code being identified based on a distance between the first sequence of tasks and a second sequence of tasks that is mapped to the anomaly code by an anomaly catalog; and when the first sequence of tasks is classified in the second category: abstaining from generating an alert.

20. The non-transitory computer-readable medium of claim 19, wherein the first sequence of tasks includes a set of identifiers, each identifier corresponding to a different one of the tasks in the first sequence of tasks.

* * * * *